(12) United States Patent
Raut

(10) Patent No.: US 11,836,549 B2
(45) Date of Patent: Dec. 5, 2023

(54) FAST BLOCK-BASED PARALLEL MESSAGE PASSING INTERFACE TRANSPOSE

(71) Applicant: Advanced Micro Devices, Inc., Santa Clara, CA (US)

(72) Inventor: Samantray Biplab Raut, Bangalore (IN)

(73) Assignee: Advanced Micro Devices, Inc., Santa Clara, CA (US)

(*) Notice: Subject to any disclaimer, the term of this patent is extended or adjusted under 35 U.S.C. 154(b) by 257 days.

(21) Appl. No.: 17/071,876

(22) Filed: Oct. 15, 2020

(65) Prior Publication Data

US 2022/0121506 A1 Apr. 21, 2022

(51) Int. Cl.
*G06F 9/54* (2006.01)
*G06F 9/52* (2006.01)

(52) U.S. Cl.
CPC ............... *G06F 9/546* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 7,688,737 B2 | 3/2010 | Archer et al. | |
| 8,281,053 B2 | 10/2012 | Archer et al. | |
| 8,312,227 B2 | 11/2012 | Li et al. | |
| 8,656,071 B1 * | 2/2014 | Onufryk | G06F 13/24 710/52 |
| 8,756,612 B2 | 6/2014 | Archer et al. | |
| 2001/0052119 A1 * | 12/2001 | Inaba | G06F 8/4441 717/160 |
| 2006/0190517 A1 * | 8/2006 | Guerrero | G06F 7/762 708/514 |
| 2009/0063529 A1 * | 3/2009 | Gustavson | G06F 17/16 |
| 2009/0063607 A1 * | 3/2009 | Gustavson | G06F 17/16 708/520 |

(Continued)

FOREIGN PATENT DOCUMENTS

WO WO2009083110 A1 7/2009

OTHER PUBLICATIONS

MPI. "A Message-Passing Interface Standard Version 3.1", Message Passing Interface Forum, dated Jun. 4, 2015, 868 pages.

*Primary Examiner* — Charles E Anya
(74) *Attorney, Agent, or Firm* — Hickman Becker Bingham Ledesma LLP

(57) ABSTRACT

Computer-implemented techniques for fast block-based parallel message passing interface (MPI) transpose are disclosed. The techniques achieve an in-place parallel matrix transpose of an input matrix in a distributed-memory multiprocessor environment with reduced consumption of computer processing time and storage media resources. An in-memory copy of the input matrix or a submatrix thereof to use as the send buffer for MPI send operations is not needed. Instead, by dividing the input matrix in-place into data blocks having up to at most a predetermined size and sending the corresponding data block(s) for a given submatrix using an MPI API before receiving any data block(s) for the given submatrix using an MPI API in the place of the sent data block(s), making the in-memory copy to use a send buffer can be avoided and yet the input matrix can be transposed in-place.

15 Claims, 10 Drawing Sheets

(56) References Cited

U.S. PATENT DOCUMENTS

| | | | |
|---|---|---|---|
| 2016/0057068 A1* | 2/2016 | Arakawa | H04L 47/50 370/412 |
| 2017/0149531 A1* | 5/2017 | Raza | H03M 13/13 |
| 2017/0262410 A1* | 9/2017 | Usui | H04L 67/10 |
| 2020/0274733 A1* | 8/2020 | Graham | G06F 12/0246 |
| 2020/0409664 A1* | 12/2020 | Li | G06F 9/3836 |

* cited by examiner

FAST BLOCK-BASED PARALLEL MESSAGE PASSING INTERFACE TRANSPOSE

TECHNICAL FIELD

The present disclosure relates to parallel computing. More specifically, some embodiments of the present disclosure relate to computer-implemented techniques for a fast block-based parallel message passing interface transpose.

BACKGROUND

The Message Passing Interface is a message-passing library interface specification. MPI addresses the message-passing parallel programming model. According to the model, data is moved from the address space of one computing task to that of another task through cooperative operations on each task. In MPI, multiple instances (called "MPI ranks") of the same program run concurrently on the same node or different nodes. MPI is used by each rank to communicate data with other ranks while processing locally a sub-operation of a larger overall operation such as a matrix transpose.

An advantage provided by the MPI specification is a standard on which higher-level software routines can be built upon lower level message-passing routines in a distributed-memory communication environment. The MPI standard promotes portability and ease of implementation of the higher-level routines. One example implementation of the MPI specification upon which higher-level routines can be built is the "Open MPI" implementation available on the internet in the open-mpi.org domain.

One high-level routine that is commonly built on an implementation of the MPI standard is matrix transpose. Matrix transpose is a fundamental operation of linear algebra and arises in many scientific and engineering and other high-performance computing applications such as, for example, Nanoscale Molecular Dynamics (NAMD) and GROningen MAchine for Chemical Simulations (GROMACS) for molecular dynamics simulations, QUANTUM ESPRESSO for first-principles electronic-structure calculations and materials modeling, and CP2K for atomistic simulations. One example of a situation where matrix transpose arises is fast Fourier transform (FFT) calculation.

Matrix transposition is often needed to be performed in a distributed-memory multiprocessor environment, for example, in case of MPI FFT calculation. In such an environment, a typical linear algebra operation is generally performed in parallel on smaller submatrices that exploit the faster access to upper levels of the memory hierarchy such as registers, cache or other processor-local memory. However, in distributed-memory multiprocessor environment, matrix transpose conventionally cannot be accomplished with exchanges of row and column indices as it can in a single processor environment. Instead, matrix data is physically moved from one computing task to another. An MPI implementation such as, for example, Open MPI or other MPI implementation may be used to accomplish the physical data movement between processors.

Parallel MPI matrix transpositions often take a substantial portion of the compute time and space of the scientific and engineering computing applications that require them. Compute time is mainly spent waiting on the MPI communication and memory operations. Where a parallel MPI matrix transposition is an in-place transpose, the storage media buffer storing the input matrix is overwritten with the transpose of the input matrix, the compute time and memory space increase even further. The increase of compute time and memory space in case of in-place MPI matrix transposition is caused by creating a temporary copy of the storage media buffer storing the input matrix (e.g., using a memcpy( ) operation or the like) for allowing the storage media buffer storing the input matrix to be overwritten with transpose matrix data simultaneously with physical movement of input matrix data among the multiple processors performing the parallel in-place matrix transpose. Computing techniques that can reduce the compute time or space for matrix transpositions especially for parallel in-place MPI matrix transpose would be appreciated.

The present disclosure addresses this and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Some embodiments of the present invention are illustrated by way of example, and not in way by limitation, in the figures of the accompanying drawings and in which like reference numerals refers to similar elements and in which.

DETAILED DESCRIPTION

Figure 1:
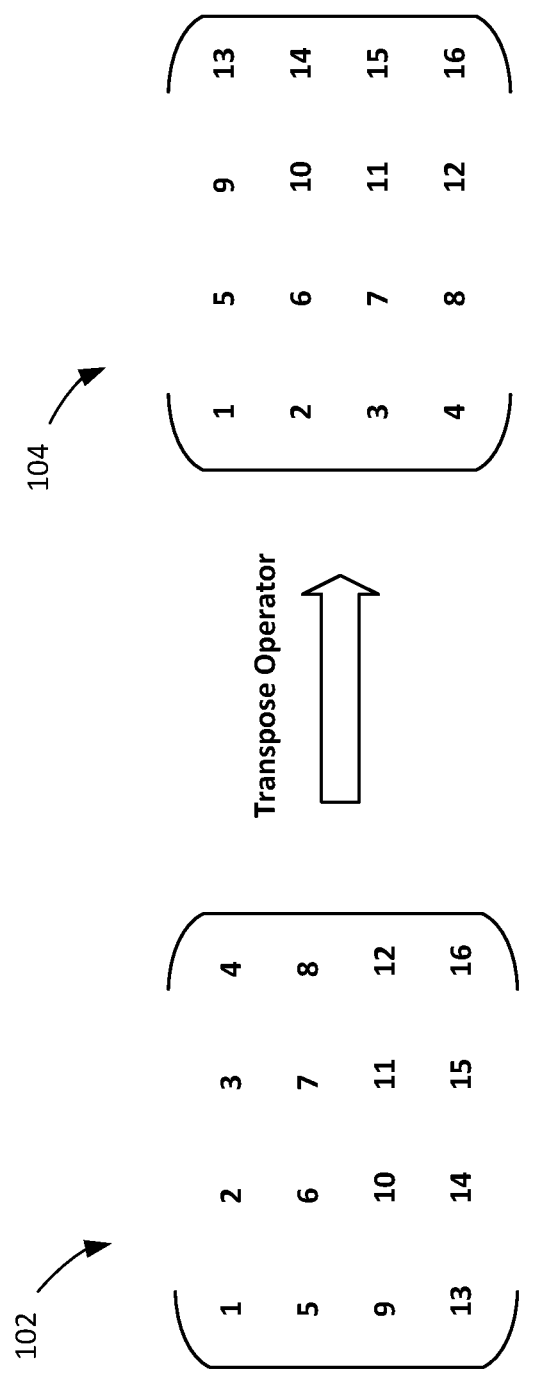
FIG. 1 depicts a matrix transpose example.

In the following description, for the purposes of explanation, numerous specific details are set forth in order to provide a thorough understanding of some embodiments of the present invention. It will be apparent, however, that some embodiments may be practiced without these specific details. In other instances, well-known structures and devices are shown in block diagram form in order to avoid unnecessarily obscuring some embodiments.

The detailed description is organized below according to the following outline:
  1.0 GENERAL OVERVIEW
  2.0 EXAMPLE MATRIX TRANSPOSE
  3.0 EXAMPLE PARALLEL MATRIX TRANSPOSE 4.0 EXAMPLE MESSAGE PASSING INTERFACE SYSTEM
5.0 BLOCKING EXAMPLE
6.0 EXAMPLE PROCESSES
7.0 HARDWARE IMPLEMENTATION
8.0 OTHER ASPECTS OF THE DISCLOSURE 1. General Overview Computer-implemented techniques for a fast block-based parallel message passing interface (MPI) matrix transpose are disclosed.

In some embodiments, the techniques encompass a first method performed at a plurality of processors in a distributed-memory multiprocessor environment. The first method includes each computing task of a set of computing tasks executing at the plurality of processors performing matrix transpose operations in parallel. At a given task of the tasks, the matrix transpose operations include determining submatrix data of an input matrix to send to one of the other tasks of the set of tasks and dividing in-place the respective submatrix data to send to the other task into a first set of submatrix data blocks. The dividing is done such that each submatrix data block has up to at most a predetermined size and without having to make an in-memory copy of the respective submatrix data to use as a send buffer.

After using an MPI application programming interface (API) to send the first set of submatrix data blocks to the other task, an MPI API is used to receive a second set of submatrix data blocks from the other task in-place of the first set of submatrix data blocks. Each submatrix data block of the second set of submatrix data blocks also has up to at most the predetermined size.

The given task may repeat these matrix transpose operations for still other tasks of the set of tasks and all other tasks may perform the matrix transpose operations like the given task as part of an overall matrix transpose operation performed with the set of tasks at the plurality of processors.

According to some embodiments, the techniques encompass a second method performed at a plurality of processors in a distributed-memory multiprocessor environment. The second method includes each computing tasks of a set of tasks executing at the plurality of processors performing matrix transpose operations in parallel. At a given task of the tasks, the matrix transpose operations include determining respective submatrix data of an input matrix to send to each other task of the set of tasks and dividing in-place the respective submatrix data to send to each other task into a respective first set of submatrix data blocks such that each submatrix data block has up to at most a predetermined size and without having to make an in-memory copy of the respective submatrix data to use as a send buffer for an MI send operation.

After using an MPI API to send a submatrix data block of the respective first set of submatrix data blocks to each other task, an MPI API is used to receive a submatrix data block of the respective second set of submatrix data blocks from each other task in-place of the respective submatrix data block of the first set of submatrix data blocks sent to each task. The given task may repeat these matrix transpose operations for other submatrix data blocks of the respective submatrix data of the input matrix and each other task may perform the matrix transpose operations like the given task as part of an overall matrix transpose operation performed with the set of tasks at the plurality of processors.

The techniques improve the operation of a computing system implementing the techniques. The techniques can be used to achieve an in-place parallel transpose of an input matrix in a distributed-memory multiprocessor environment with much lower compute time and a reduced consumption of computer storage media (e.g., memory) resources. In particular, an in-memory copy of each submatrix of the input matrix to use as the send buffer for MI send operations is not needed. Instead, by dividing the input matrix in-place into data blocks having up to at most a predetermined size and sending the data blocks for a given submatrix using a MPI API before receiving any data blocks for the given submatrix in-place of the sent data blocks using a MI API, the in-memory copy of the corresponding submatrix of the input matrix can be avoided and yet the input matrix can be transposed in-place. When data blocks are received for a given submatrix of the input matrix, the given submatrix of the input matrix can be safely transposed in-place because the data blocks of the given submatrix have already been sent to other task(s). A copy (e.g., a memcpy) of the submatrix of the input matrix to use as the send buffer for MPI send operations is not needed.

Scientific and engineering and other high-performance computing applications can require multiple matrix transpose operations where each such operation involves transposing an input matrix. For example, a parallel MPI fast Fourier transform (FFT) operation based on six-step algorithm can require three matrix transpose operations. By avoiding the memory copy of the input matrix for each matrix transpose operation of an overall scientific or engineering operation (e.g., an FFT operation), the total compute time of the overall scientific or engineering operation can be reduced, thereby improving the operation of the computing system performing the overall operation.

The foregoing and other embodiments will now be described in greater detail with respect to the figures.

2. Example Matrix Transpose

FIG. 1 depicts a matrix transpose example. Conceptually, the transpose of an input matrix M involves reflecting the input matrix M over a diagonal which runs from top-left of the input matrix M to the bottom-right of the input matrix M to obtain a transposed matrix M(T) of the input matrix M. The effect of a matrix transpose operator is to write the rows of the input matrix M as the columns of transposed matrix M(T) or to write the columns of the input matrix M as the rows of the transposed matrix M(T). In this example, the elements of input matrix 102 and transposed matrix 104 are integers between 1 and 16 inclusive and transposed matrix 104 is the result of applying a matrix transpose operator to input matrix 102.

In a computer, the input matrix M is typically stored in computer storage media (or just "storage media") in row-major order or column-major order. The storage media may be provided by a single computer system or the storage media may be distributed over multiple computer systems. With row-major order, consecutive rows of the input matrix M are contiguous in storage media. For example, if input matrix 102 is stored in row-major order, then the elements of input matrix 102 may be ordered contiguously in storage media as: [1, 2, 3, 4, 5, 6, 7, 8, 9, 10, 11, 12, 13, 14, 15, 16]. With column-major order, consecutive columns of the input matrix M are contiguous in storage media. For example, if input matrix 102 is stored in column-major order, then the elements of input matrix 102 may be ordered contiguously in storage media as: [1, 5, 9, 13, 2, 6, 10, 14, 3, 7, 11, 15, 4, 8, 12, 16].

A computer-implemented matrix transpose operator might effectively transpose the input matrix M, without physically transposing the input matrix M in storage media, simply by accessing elements of the input matrix M in a particular order. However, it is often desirable to physically transpose the input matrix M in storage media by moving matrix data to different storage locations in storage media. For example, when the input matrix M is stored in storage media in row-major order, the rows of the input matrix M may be contiguous in memory and the columns may be discontinuous. If repeated linear algebra operations are to be performed on the columns such as, for example, in a fast Fourier transform (FFT), then physically transposing the input matrix M in storage media to make the columns contiguous in storage media can improve performance of the FFT transform by improving spatial locality of matrix data in storage media. Thus, computer-implemented matrix transpose operators may physically transpose the input matrix M in storage media.

Data stored in storage media representing one or more elements of a matrix is referred to herein as "matrix data." For example, the data stored in storage media representing one or more of the integers 1 through 16 is matrix data of matrix 102. An "element" of a matrix refers to the matrix data at the intersection of a row and a column of the matrix. For example, the matrix data stored in storage media representing the integer 6 in the second row and the second column of matrix 102 is an element of matrix 102 representing the integer 6.

While an element of a matrix may represent a signed or unsigned integer, an element of a matrix may represent a floating-point number. A matrix element may also represent a character string. According to some embodiments, the techniques disclosed herein for fast block-based parallel MPI transpose treat an element of a matrix, and matrix data generally, as opaque data stored in storage media. In other words, an element, and matrix data generally, are treated as a sequence of one or more data bytes.

3. Example Parallel Matrix Transpose

Although in the example of FIG. 1 input matrix 102 has only sixteen elements, in practice the input matrix M can be quite large having thousands of elements or more. In this case, it may be desirable to physically transpose the input matrix M in storage media "in-place."

In-place matrix transposition refers to physically transposing the input matrix M in storage media while minimizing or reducing the additional space allocated in storage media to achieve the transposition. Typically, in-place transpose of the input matrix M involves overwriting matrix data of the input matrix M in storage media. If the input matrix M is non-square having a different number of rows and columns, in-place transpose can involve a complex permutation of matrix data.

According to some embodiments, techniques are disclosed herein for achieving a parallel in-place physical transpose of the input matrix M in a distributed-memory multiprocessor environment that reduces the compute time involved in the transposition and also the storage media allocation overhead. While in some embodiments and in the examples provided herein the input matrix M is a square matrix having the same number of rows and columns, the techniques disclosed herein can be applied likewise to the input matrix M that is non-square having a different number of rows and columns. And while in some embodiments the techniques accomplish an in-place transpose of the input matrix M, the techniques are not limited to in-place matrix transpose and may be applied to achieve out-of-place matrix transpose. According to some embodiments, the techniques are disclosed herein to achieve transpose of the input matrix M wherein the input matrix M can be real or complex (having real and imaginary terms for each matrix element) matrix.

Figure 2:
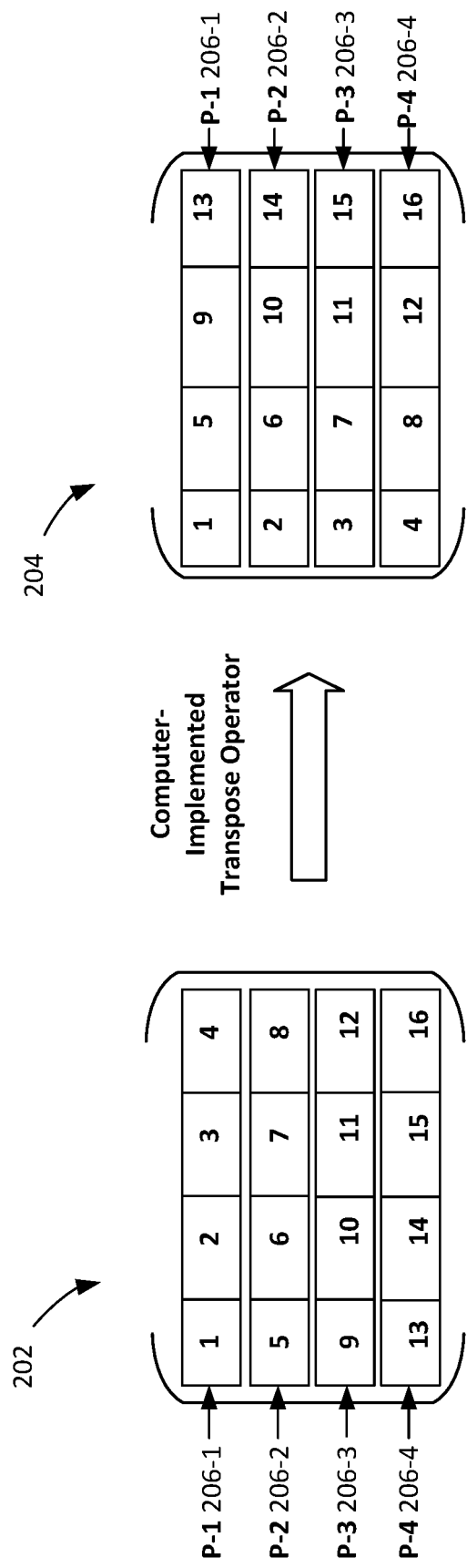
FIG. 2 depicts a parallel matrix transpose example.

FIG. 2 depicts a parallel matrix transpose example in a distributed-memory multiprocessor environment, according to some embodiments of the present invention. In the example of FIG. 2, input matrix 202 and transposed matrix 204 are depicted. However, some details of the fast block-based parallel MPI transpose are not depicted. Those details are provided in greater detail elsewhere in this description.

The distributed-memory multiprocessor environment may include a number of hardware processors P for performing the fast block-based parallel MPI transpose. In the example of FIG. 2, four processors 206-1, 206-2, 206-3, and 206-4 are available. However, more or fewer processors can be used, and the techniques disclosed herein for fast block-based parallel MPI transpose are not limited to any particular number of processors.

A processor in the set of hardware processors P can be a general-purpose microprocessor such as a central processing unit (CPU) or a core thereof. Alternatively, a processor in the set of processors P can be a special-purpose microprocessor a graphics processing unit (GPU), an embedded system, a system on a chip, or a specialized integrated circuit for performing linear algebra operations on matrices.

Depending on the implementation, the number of computer systems providing the set of processors P can be different from the number of processors P. For example, all four processors 206-1, 206-2, 206-3, and 206-4 can be provided by a single computer system. For example, each processor 206-1, 206-2, 206-3, and 206-4 may be a core of a microprocessor. As an alternative example, each processor 206-1, 206-2, 206-3, and 206-4 may be a microprocessor of a different computer system.

The input matrix M may be partitioned, and the partitions distributed over the processors P to divide the overall matrix transpose operation into sub-operations that can be performed in parallel on the set of processors P. In particular, a different submatrix of the input matrix M may be assigned to each processor and each processor may perform transposition and linear algebra operations on its own submatrix in parallel with the other processors so as to reduce the compute time of the overall matrix transpose operation.

A submatrix of the input matrix M refers to all elements in zero or more selected rows of the input matrix M and zero or more selected columns of the input matrix M where at least one element of the input matrix M is selected for inclusion in the submatrix. While the selected rows can be contiguous in the input matrix M and the selected columns can be contiguous in the input matrix M, there is no requirement for this and either or both the set of selected rows and the set of selected columns can be discontinuous in the input matrix M. Further, while the same number of rows and columns can be selected, different numbers of row and columns of the input matrix M can be selected.

In the example of FIG. 2, input matrix 202 is distributed over the processors 206. In particular, processor 206-1 is assigned the first row of input matrix 202, processor 206-2 is assigned the second row of input matrix 202, processor 206-3 is assigned the third row of input matrix 202, and processor 206-4 is assigned the fourth row of input matrix 202.

The selection and assignments of submatrices of the input matrix M to the processors P can be made with a centralized computing process. Alternatively, a computer program running on each processor in the set of processors P may separately and independently determine one or more submatrices of the input matrix M assigned to it. The techniques disclosed herein for fast block-based parallel MPI transpose are not limited to any particular technique or algorithm for assigning submatrices of the input matrix M to the set of processors P.

In the example of FIG. 2, each row of input matrix 202 is assigned to a separate one of processors 206 (e.g., striped partitioning by row). However, each column of input matrix 202 could be assigned to a separate one of processors 206 instead (e.g., striped partitioning by column). More generally, various different algorithms may be employed to select and assign submatrices of the input matrix M to the set of processors P. For example, submatrices of the input matrix M may be selected and assigned to the set of processors P according to any of the following schemes: striped partitioning, block-striping, cyclic-striping, or block-cyclic striping. Further, if the number of processors P is less than the number of submatrices of the input matrix M, then more than one submatrix can be assigned to a single processor.

To achieve a parallel physical transpose of the input matrix M in a distributed-memory multiprocessor environment, matrix data is sent between the processors P. Each processor may send matrix data to one or more other of the processors P and each processor may receive matrix data from one or more other of the processors P. In some cases, each processor sends matrix data to every other processor in the set of processors P and each processor receives matrix data from every other processor in the set of processors P.

For example, processor 206-1 sends element 2 to processor 206-2, sends element 3 to processor 206-3, and sends element 4 to processor 206-4. Processor 206-1 receives element 5 from processor 206-2, receives element 9 from processor 206-3, and receives element 13 from processor 206-4. Similar sends and receives are performed by processors 206-2, 206-3, and 206-3. The result of all of these sends and receives is that each processor 206-1, 206-2, 206-3, and 206-4 can perform desired compute operations on a respective column of the input matrix 202 in parallel.

The sending and receiving of matrix data between processors can be accomplished using an MPI implementation. MPI is a message-passing library interface specification. MPI addresses the message-passing parallel programming model. According to the model, data is moved from the address space of one computing task to that of another computing task through cooperative operations on each computing task. An advantage provided by the MPI specification is a standard on which higher-level software routines can be built upon lower level message-passing routines in a distributed memory communication environment. The MPI standard promotes portability and ease of implementation of the higher-level routines. A current version of the MPI standard is version 3.1 and available on the internet at /docs/mpi-3.1/mpi31-report.pdf in the mpi-forum.org domain. One example implementation of the MPI specification upon which higher-level routines can be built is the "Open MPI" implementation available on the internet in the open-mpi.org domain.

4. Example Message Passing Interface System

According to some embodiments, the techniques disclosed herein for fast block-based parallel MPI transpose in a distributed-memory multiprocessor environment use an implementation of the MPI to accomplish an in-place physical transpose of the input matrix M. This is illustrated by the example of FIG. 3 and FIG. 4 which builds on the example of FIG. 2 above.

Figure 3:
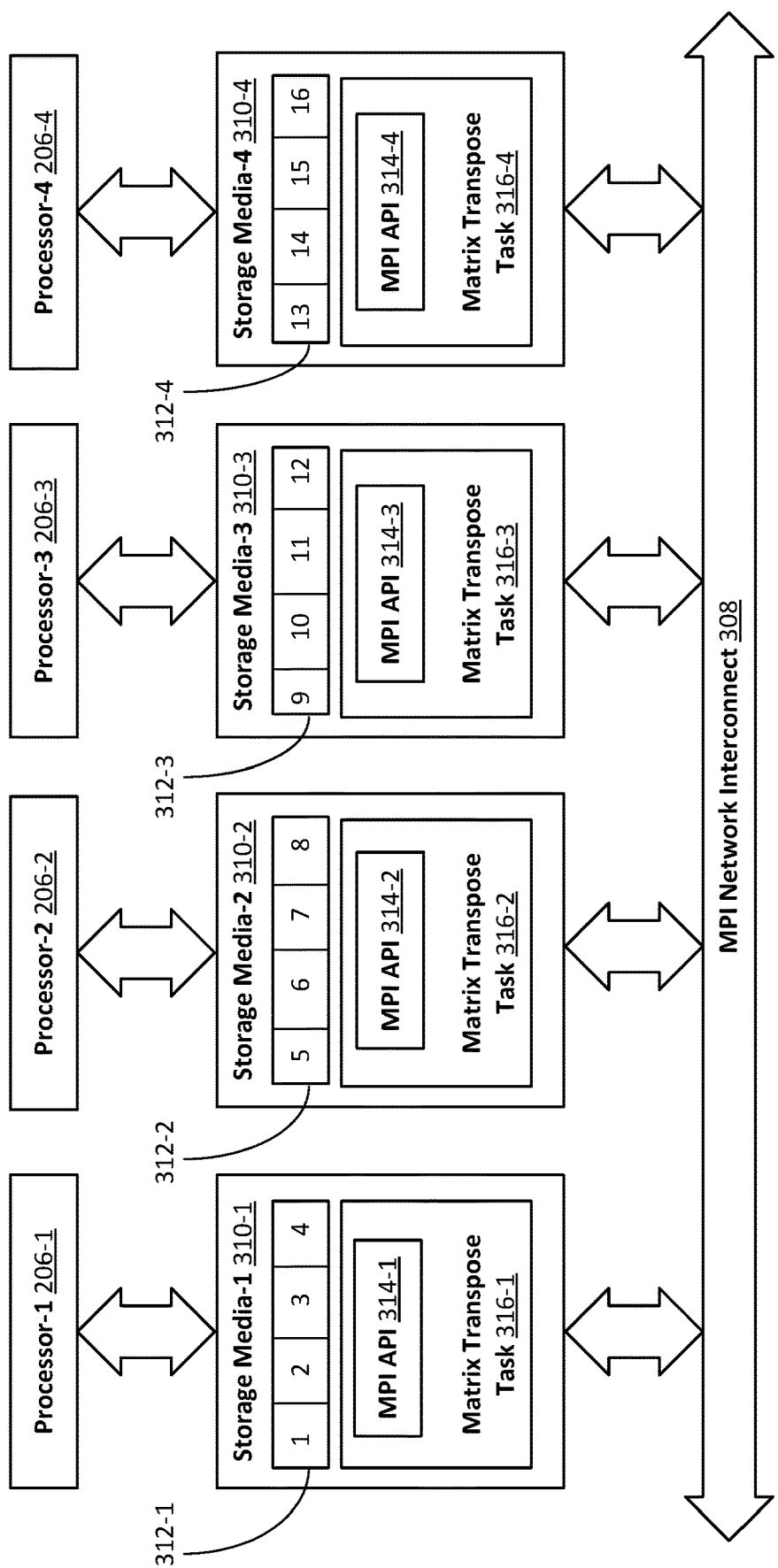
FIG. 3 depicts an example messaging passing interface system storing an input matrix.
Figure 4:
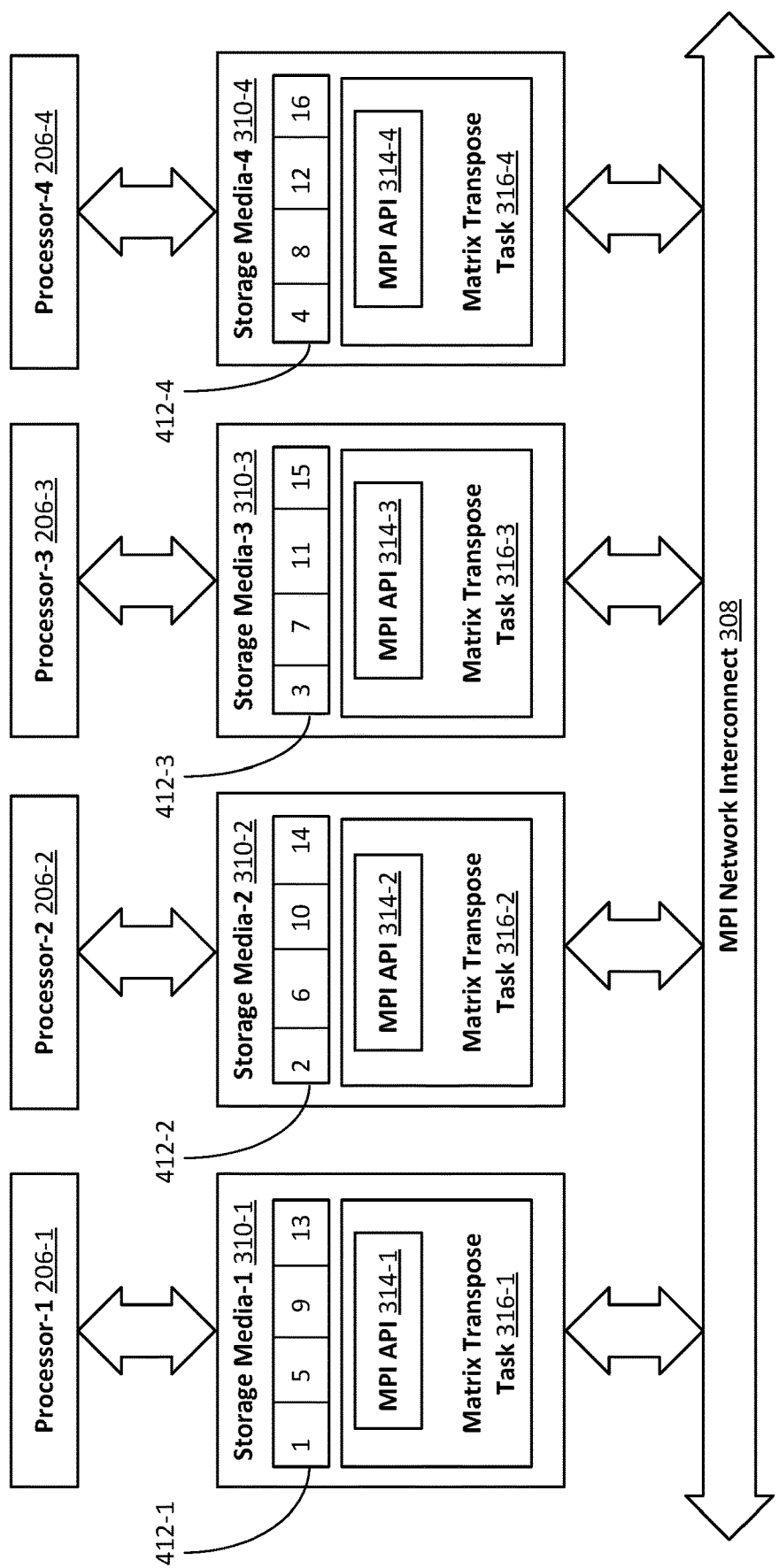
FIG. 4 depicts the example messaging passing interface system of FIG. 3 of the input matrix is transposed.

In FIG. 3, processor 206-1, 206-2, 206-3, and 206-4 each executes a respective instance of matrix transpose program 316 as a computing task or just "task." As used herein, the term "computing task" or just "task" is used broadly to refer to a sequence of executed programmed instructions of a computer program that can be managed independently by an operating system scheduler, at the kernel-level or at the user-level. For example, a "task" as used herein can be a computer process or a thread thereof. A task can be a user-level task that executes on a respective one of the processors 206-1, 206-2, 206-3, or 206-4 with the aid of an operating system. However, the task can execute in kernel-space or in a combination of user-space and kernel-space. As shown in FIG. 3, processor 206-1 executes matrix transpose task 316-1, processor 206-2 executes matrix transpose task 316-2, processor 206-3 executes matrix transpose task 316-3 and processor 206-4 executes matrix transpose task 316-4.

Storage media 310-1, 310-2, 310-3, and 310-4 may each be implemented with any sort of suitable volatile or non-volatile computer storage media. Example forms of suitable volatile computer storage media include SRAM or DRAM (e.g., SDRAM, DDR, GDDR, HBM, SRAM). Examples forms of suitable non-volatile computer storage media include flash memory devices such as NAND flash or solid-state drives (SSD) and magnetic devices such as hard disks. The storage media accessible to a matrix transpose task (e.g., 316-1) may physically provide the address space of the task. The address space is the range of valid address in storage media that the task can access.

Storage media 310-1, 310-2, 310-3, and 310-4 may each be implemented with multiple forms of computer storage media arranged in a memory hierarchy such as, for example, fast access but small capacity SRAM at the top of the hierarchy, slower but larger capacity DRAM at the next level down in the hierarchy, and slowest but largest capacity SSD at the bottom level of the hierarchy. The address space of a matrix transpose task (e.g., 316-1) may use different types of storage media in the hierarchy at different times.

Tasks 316-1, 316-2, 316-3, and 316-4 each have access to a respective executable instance of an MPI implementation that the task may use to accomplish point-to-point message communications via MPI byte transfer layer (BTL) or equivalent network interconnect 308. MPI network interconnect 308 may be a byte transfer layer (BTL) network interconnect or the like over which the MPI implementation can send and receive messages between storage media 310-1, 310-2, 310-3, and 310-4 using point-to-point data communications (e.g., a communication with one sender and one receiver). Examples of MPI network interconnect 308 include shared memory, Transmission Control Protocol (TCP) sockets, MYRINET, or INFINIBAND.

MPI API 314-1 represents the executable instance of the MPI implementation used by task 316-1 to accomplish point-to-point message communications via MPI network interconnect 308. MPI API 314-2 represents the executable instance of the MPI implementation used by task 316-2 to accomplish point-to-point message communications via MPI network interconnect 308. MPI API 314-3 represents the executable instance of the MPI implementation used by task 316-3 to accomplish point-to-point message communications via MPI network interconnect 308. MPI API 314-4 represents the executable instance of the MPI implementation used by task 316-4 to accomplish point-to-point message communications via MPI network interconnect 308.

MPI API 314-1, 314-2, 314-3, and 314-4 may each offer callable or invokable functions, procedures, or sub-routines to the respective matrix transpose task to accomplish point-to-point message communications via MPI network interconnect 308. For example, MPI API 314-1, 314-2, 314-3, and 314-4 may each offer a send function to the respective matrix transpose task to accomplish a point-to-point send of matrix data via MPI network interconnect 308. For example, MPI API 314-1, 314-2, 314-3, and 314-4 may each offer the following send function represented by its function prototype in the C programming language:

```
int MPI_Send(const void *buf,
    int count,
    MPI_Datatype datatype,
    int dest,
    int tag,
    MPI_Comm comm)
```

In the above function prototype, the parameter "buf" is a pointer to the send buffer containing the bytes to send. According to some embodiments, creating an in-memory copy of matrix data of the input matrix M to pass as the send buffer to MPI_send can be avoided thereby improving the compute time and space of a parallel MPI matrix transpose.

In addition, MPI API 314-1, 314-2, 314-3, and 314-4 may each offer a receive function to the respective matrix transpose task to accomplish a point-to-point receive of matrix data via MPI network interconnect 308. For example, MPI API 314-1, 314-2, 314-3, and 314-4 may each offer the following receive function represented by its function prototype in the C programming language:

```
int MPI_Recv(void *buf,
    int count,
    MPI_Datatype datatype,
    int source,
    int tag,
    MPI_Comm comm,
    MPI_Status *status)
```

In the above function protocol, the parameter "buf" is a pointer to a buffer for containing the bytes received. According to some embodiments, an in-place matrix transpose is possible by passing a pointer to the address of matrix data of the input matrix to be overwritten with the received bytes where the matrix data to be overwritten has already been sent to other process(es) (e.g., using MPI_Send) and thus can be safely overwritten in-place.

While the above function prototypes provide one example of an MPI API for point-to-point sending and receiving of messages via MPI network interconnect 308, other MPI APIs are possible and the techniques disclosed herein for fast block-based parallel MPI transpose are not limited to any particular MPI API implementation. For example, blocking or non-blocking MPI send and receive calls may be made by the matrix transpose program during execution.

In the example of FIG. 3, like in the example of FIG. 2, submatrix 312-1 of input matrix 202 is assigned to processor 206-1. Submatrix 312-2 of input matrix 202 is assigned to processor 206-2. Submatrix 312-3 of input matrix 202 is assigned to processor 206-3. Submatrix 312-4 of input matrix 202 is assigned to processor 206-4. The result of the matrix transpose operation is depicted in FIG. 4. Submatrix 412-1 of transposed matrix 204 represents an in-place transpose of submatrix 312-1 of input matrix 202. Submatrix 412-2 of transposed matrix 204 represents an in-place transpose of submatrix 312-2 of input matrix 202. Submatrix 412-3 of transposed matrix 204 represents an in-place transpose of submatrix 312-3 of input matrix 202. Submatrix 412-4 of transposed matrix 204 represents an in-place transpose of submatrix 312-4 of input matrix 202.

In the example of FIG. 3 and FIG. 4, matrix data is sent between tasks 316-1, 316-2, 316-3, and 316-4 via MPI network interconnect 308 as part of the matrix transpose operation. In particular, task 316-1 uses MPI API 314-1 to send element 2 of submatrix 312-1 to task 316-2, to send element 3 of submatrix 312-1 to task 316-3, and to send element 4 of submatrix 312-1 to task 316-4. Likewise, task 316-2 uses MPI API 314-2 to send element 5 of submatrix 312-2 to task 316-1, to send element 7 of submatrix 312-2 to task 316-3, and to send element 8 of submatrix 312-2 to task 316-4. Likewise, task 316-3 uses MPI API 314-3 to send element 9 of submatrix 312-3 to task 316-1, to send element 10 of submatrix 312-3 to task 316-2, and to send element 12 of submatrix 312-3 to task 316-4. Likewise, task 316-4 uses MPI API 314-4 to send element 13 of submatrix 312-4 to task 316-1, to send element 14 of submatrix 312-4 to task 316-2, and to send element 15 of submatrix 312-4 to task 316-3.

5. Blocking Example

According to some embodiments, when matrix data of the input matrix M is to be sent from a matrix transpose task to be received by another matrix transpose task, the matrix data is divided in-place into submatrix data blocks where each submatrix data block has up to at most a predetermined number of bytes (up to at most a predetermined size). The predetermined size is determined based on the maximum number of bytes that can be sent point-to-point in an MPI message via MPI network interconnect 308 without requiring the intended recipient matrix transpose task of the message to first communicate to the sending matrix transpose task that it is okay to send the message. Instead, the sending task can send the MPI message "eagerly" without having to wait for a prior okay-to-send message to be received from the intended recipient task.

A mode of MPI point-to-point message communication where the sending task can send an MPI message to the intended recipient process and safely assume that the intended recipient task can buffer the MPI message and without having to wait to receive a prior acknowledgment from the intended recipient task that it is ready to receive the MPI message is referred to here as the "eager" mode of MPI point-to-point message communication. On the other hand, a mode of MPI point-to-point message communication where the sending task only sends the MPI message to the intended recipient task when the intended recipient task expressly communicates to the sending task that it is ready to receive the MPI message is referred to herein as the "rendezvous" mode of MPI point-to-point message communication.

By dividing in-place matrix data into submatrix data blocks and sending each submatrix data block in a respective MPI message where the size of submatrix data block sent in the MPI message is not greater than a predetermined size, the sending and receiving matrix transpose tasks can use, in conjunction with the MPI API of the tasks, the eager mode of MPI point-to-point message communication for sending and receiving matrix data via MPI network interconnect 308. By using the eager mode, parallel in-place matrix transpose of the input matrix M can be accomplished without having to make in-memory copies of the input matrix or submatrices thereof to use as send or receive buffers for the MPI API.

According to some embodiments, the predetermined size varies depending on an eager limit. The eager limit varies depending on the type of MPI network interconnect 308. The eager limit is the maximum size in bytes of an MPI message that can be sent via MPI network interconnect 308 while still operating in eager mode. Rendezvous mode is needed for MPI messages larger than the eager limit of the MPI network interconnect 308. For example, if MPI network interconnect 308 is based on TCP sockets, then the eager limit might be 64K bytes. If MPI network interconnect 308 is based on shared memory, then the eager limit might be 4K bytes. If the MPI network interconnect 308 is based on INFINIBAND, then the eager limit might be 12K bytes. The predetermined size can be equal to or slightly less than the eager limit of MPI network interconnect 308. The predetermined size may be less than the eager limit of MPI network interconnect 308 to account for MPI message envelope data such that the sum of the submatrix data block size and the envelope data size is less than or equal to the eager limit of MPI network interconnect 308. An MPI implementation may provide an interface (e.g., a command line interface or a configuration file interface) to increase or decrease (configure) this eager limit.

Figure 5:
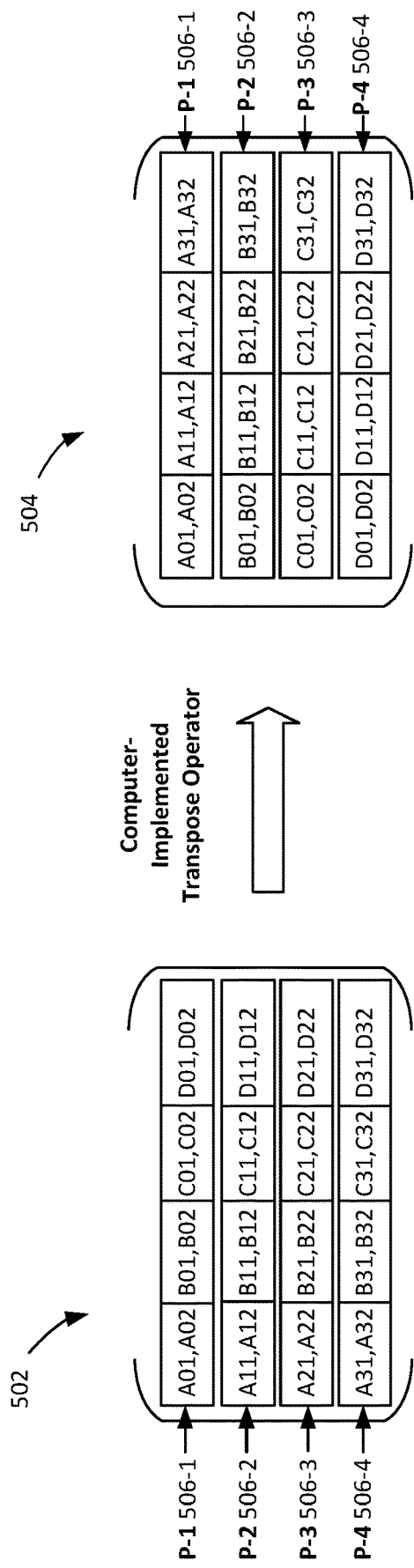
FIG. 5 depicts an example of dividing in-place input matrix data into submatrix data blocks.

FIG. 5 depicts an example of dividing input matrix 502 in-place into submatrix data blocks and sending and receiving the submatrix data blocks to produce transposed matrix 504. Processor 506-1, 506-2, 506-3, and 504-4 are each assigned a respective submatrix of input matrix 502. The matrix transpose task executing on each processor 506-1, 506-2, 506-3, and 506-4 sends submatrix data to each other matrix transpose task executing on each other processor. For example, the matrix transpose task executing on processor 506-1 sends submatrix data B01, B02 to the matrix transpose task executing on processor 506-2, sends submatrix data C01, C02 to the matrix transpose task executing on processor 506-3, and sends submatrix data D01, D02 to the matrix transpose task executing on processor 506-4.

Before sending submatrix data to a matrix transpose task, the sending matrix transpose task divides the submatrix data to be sent in-place into submatrix data blocks. For example, the matrix transpose task executing on processor 506-1 divides in-place the submatrix data B01, B02 into submatrix data block B01 and submatrix data block B02. Each submatrix data block B01 and B02 have up to at most a predetermined size that is based on the eager limit of the MPI network interconnect between processors 506-1, 506-2, 506-3, and 506-4.

Before a matrix transpose task overwrites in storage media its assigned submatrix data of input matrix 502 with matrix data received from another matrix transpose task executing on another processor, the matrix transpose task ensures that the submatrix data to be overwritten in storage media has been sent to other matrix transpose task(s) before receiving the matrix data from the other matrix transpose task. For example, the matrix transpose task executing on processor 506-1 ensures that submatrix data blocks B01, B02 are each sent to the matrix transpose task executing on processor 506-2 before receiving submatrix data blocks A11, A12 from the matrix transpose task executing on processor 506-2. Further, because the submatrix data blocks are at most up to the predetermined size, input matrix 502 can be used as both a send buffer and a receive buffer for MPI send and receive operations.

As an example, assume submatrix data B01, B02 of input matrix 502 at processor 506-1 is stored at address X and submatrix data A11,A12 of input matrix 502 at processor 506-2 is stored at address Y where addresses X and Y can be physically different storage media systems such as, for example, storage media at different computer systems. Further assume, each of submatrix data blocks B01, B02, A11 and A12 have a block size of Z bytes. Then, the matrix transpose task executing at processor 506-1 can perform the following operations in the order specified:

1. Send block B01→MPI send Z bytes at address X to the matrix transpose task executing at processor 506-2.
2. Send block B02→MPI send Z bytes at address X+Z to the matrix transpose task executing at processor 506-2.
3. Receive block A11→MP receive Z bytes into address X from the matrix transpose task executing at processor 506-2.
4. Receive block A12→MP receive Z bytes into address X+Z from the matrix transpose task executing at processor 506-2.

Likewise, the matrix transpose task executing at processor 506-2 can perform the following operations in the order specified in parallel with the above operations performed by the matrix transpose task executing at processor 506-1:

1. Send block A11→MPI send Z bytes at address Y to the matrix transpose task executing at processor 506-1.
2. Send block A12→MPI send Z bytes at address Y+Z to the matrix transpose task executing at processor 506-1.
3. Receive block B01→MP receive Z bytes into address Y from the matrix transpose task executing at processor 506-1.
4. Receive block B02→MP receive Z bytes into address Y+Z from the matrix transpose task executing at processor 506-1.

Because the matrix transpose task executing at processor 506-1 sends submatrix data blocks B01 and B02 before receiving submatrix data blocks A11 and A12, it can safely overwrite submatrix data blocks B01 and B02 in-place in the submatrix assigned to processor 506-1. Likewise, because the matrix transpose task executing at processor 506-2 sends submatrix data blocks A11 and A12 before receiving submatrix data blocks B01 and B02, it also can safely overwrite submatrix data blocks A11 and A12 in-place in the submatrix assigned to processor 506-2. In this way, a block based parallel in-place matrix transpose is achieved. Further, because the submatrix data blocks are at most up to the predetermined size, the parallel in-place matrix transpose is achieved in eager mode using input matrix 502 as the send buffer and as the receive buffer for MPI send and receive operations.

6. Example Processes

Figure 6:
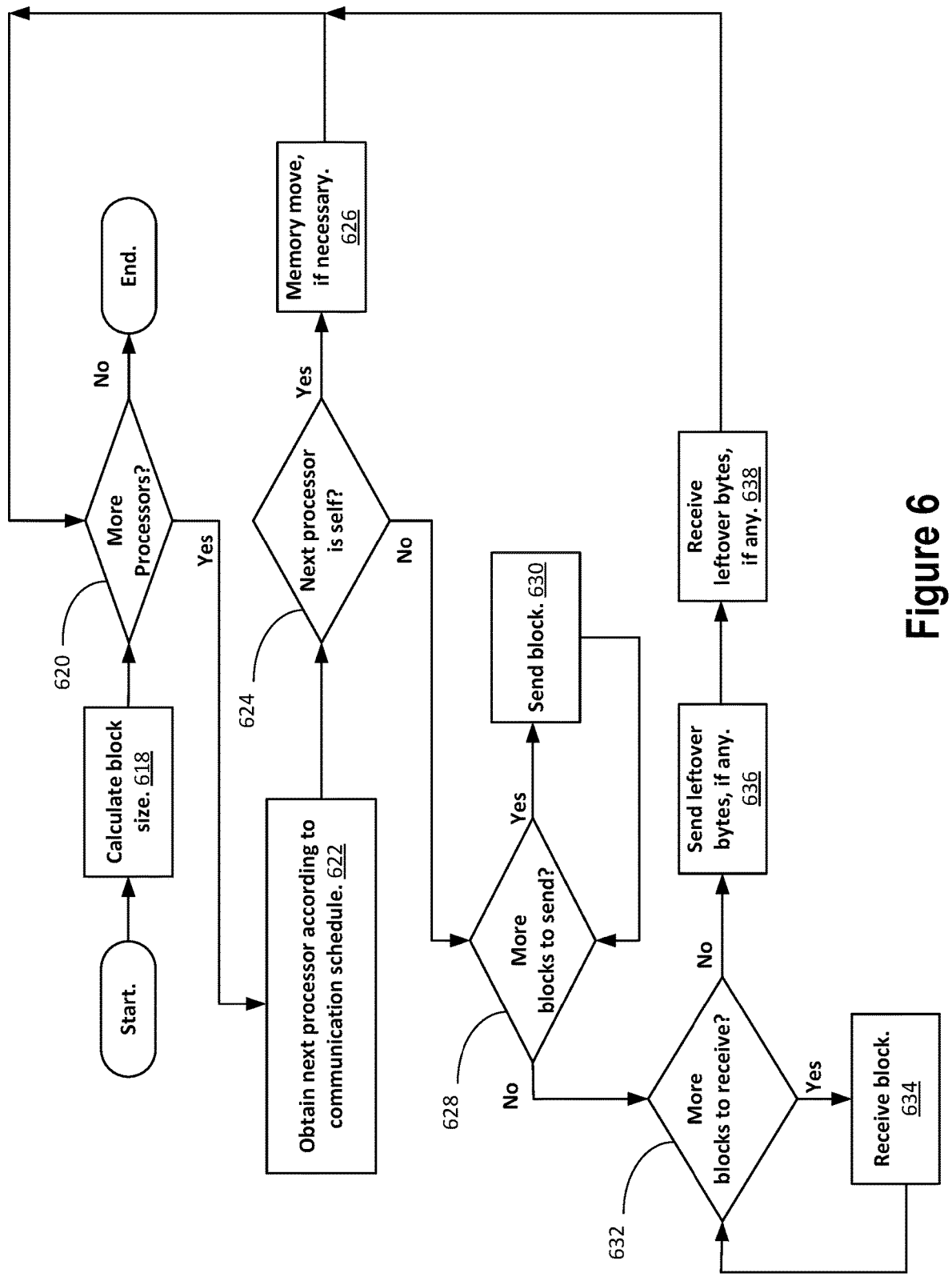
FIG. 6 is a flowchart of a first example method for fast block-based parallel message passing interface matrix transpose.

FIG. 6 illustrates an example method performed by a "target" matrix transpose task executing on a processor of the set of available processors P in accordance with some embodiments of the present invention. FIG. 6 is shown in simplified, schematic format for purposes of illustrating a clear example and other embodiments may include more, fewer, or different elements connected in various manners. FIG. 6 is intended to disclose an algorithm, plan or outline that can be used to implement one or more computer programs or other software elements which when executed cause performing the functional improvements and technical advances that are described herein. Furthermore, the flow diagram is described at the same level of detail that persons of ordinary skill in the art ordinarily use to communicate with one another about algorithms, plans, or specifications forming a basis of software programs that they plan to code or implement using their accumulated skill and knowledge.

The method starts given some "target" submatrix data for which the target matrix transpose task is tasked to send to one or more other matrix transpose tasks as part of an overall parallel matrix transpose of the input matrix. For example, the matrix transpose task executing on processor 506-1 has the submatrix data B01, B02, C01, C02, D01, D02 of input matrix 502 to send to the other matrix transpose tasks executing on the other processors 506-2, 506-3, and 506-4. Submatrix data A01, A02 of input matrix 502 will stay in-place in transposed matrix 504 and does not need to be sent from the target matrix transpose task to another matrix transpose task.

At operation 618, the target matrix transpose task determines the submatrix data block size for the target submatrix data to send to each other matrix transpose task. This determination may be made based on the eager limit for the MPI network interconnect being used. If the size of the target submatrix data to send to each other matrix transpose task plus the size of any envelope data for MPI messages is less than the eager limit, then the submatrix data block size is the size of the target submatrix data to send to each other matrix transpose task. Otherwise, the submatrix data block size is the eager limit minus the size of any per-MPI message envelope data. In situations where an envelope with message header data is not used, then the size of the target submatrix data to send to other matrix transpose task is the size of the target submatrix data or the eager limit, whichever is smaller.

For example, referring to FIG. 5, the size of submatrix data B01, B02 is the size of the target submatrix data to send to each other matrix transpose task and the matrix transpose task executing on processor 506-1 divides in-place the submatrix data B01, B02 into submatrix data block B01 and submatrix data block B02. Each submatrix data block B01 and B02 have a size up to at most the eager limit of the MPI network interconnect being used.

At operation 620, if there are more matrix transpose tasks for the target matrix transpose task to send target submatrix data to, then the method continues to operation 622. Otherwise, the method ends.

At operation 622, the next matrix transpose task for the target matrix transpose task to send target submatrix data to is determined. The next matrix transpose task can be determined according to a predetermined communication schedule. Any optimal communication schedule for accomplishing deadlock-free pairwise exchanges of submatrix data may be used. For example, the matrix transpose task executing on processor 506-1 may pairwise exchange submatrix data with the matrix transpose tasks executing on processor 506-2, then processor 506-3, and finally processor 506-4 in that order, the matrix transpose task executing on processor 506-2 may pairwise exchange submatrix data with the matrix transpose tasks executing on processor 506-1, then processor 506-4, and finally processor 506-3 in that order, the matrix transpose task executing on processor 506-3 may pairwise exchange submatrix data with the matrix transpose tasks executing on processor 506-4, then processor 506-1, and finally processor 506-2 in that order, and the matrix transpose task executing on processor 506-4 may pairwise exchange submatrix data with the matrix transpose tasks executing on processor 506-3, then processor 506-2, and finally processor 506-1 in that order. As per certain communication schedule method, the predetermined communication schedule at each of the matrix transpose tasks may also include a slot for itself mainly in case of a non-square input matrix where submatrix data may be moved in-place locally as part of the matrix transpose operation.

At operation 624, if the next matrix transpose task in the predetermined communication schedule for the target matrix transpose task is the target matrix transpose task (e.g., the next matrix transpose task is itself), then submatrix data may be moved 626 in-place locally by the target matrix transpose task within storage media accessible to target matrix transpose task as part of the matrix transpose operation mainly in the case where the input matrix is non-square. If the input matrix is a square matrix or submatrix data will stay in-place, then operation 626 may be a no-op. The method then returns from operation 626 to operation 620.

On the other hand, if, at operation 624, the next matrix transpose task in the predetermined communication schedule for the target matrix transpose task is another matrix transpose task executing on the set of available processors P, then all whole submatrix data blocks of the target submatrix data to be sent to the next matrix transpose task are sent 628, 630, one at a time in succession, to the next matrix transpose task. A "whole" submatrix data block is one that is equal in size to the submatrix data block size predetermined at block 618.

For example, if the target matrix transpose task is the task executing on processor 506-1 and the next matrix transpose task in the predetermined communication schedule for the target matrix transpose task is the matrix transpose task executing on processor 506-2, then at operations 628 and 630, submatrix data block B01 is sent in an MPI message from the matrix transpose task executing on processor 506-1 to the matrix transpose task executing on processor 506-2, and then submatrix data block B02 is sent in a next MPI message from the from the matrix transpose task executing on processor 506-1 to the matrix transpose task executing on processor 506-2.

At operations 632 and 634, all whole submatrix data blocks to be received from the next matrix transpose task determined at operation 622 are received from the next matrix transpose task one at a time in succession. For example, if the target matrix transpose task is the process executing on processor 506-1 and the next matrix transpose task in the predetermined communication schedule for the target matrix transpose task is the matrix transpose task executing on processor 506-2, then at operations 632 and 634, submatrix data block A11 is received at the matrix transpose task executing on processor 506-1 in an MPI message sent from the matrix transpose task executing on processor 506-2, and then submatrix data block A12 is received at the matrix transpose task executing on processor 506-1 in an MPI message sent from the from the matrix transpose task executing on processor 506-2.

At operation 636, the target matrix transpose task sends any leftover bytes to the next matrix transpose task that are left over after all of the whole submatrix data blocks have been sent 628, 630 to the next matrix transpose task. Operation 636 may involve the target matrix transpose task sending a single MPI message containing left-over bytes to the next matrix transpose task. The number of left-over bytes sent, if any, will be less than the predetermined submatrix data block size.

At operation 638, the target matrix transpose task receives any leftover bytes from the next matrix transpose task that are left over after all of the whole submatrix data blocks have been received 632, 634 from the next matrix transpose task. Operation 638 may involve the target matrix transpose task receiving a single MPI message containing left-over bytes from the next matrix transpose task. The number of leftover bytes received, if any, will be less than the predetermined submatrix data block size.

The method then returns to operation 620.

Each matrix transpose process executing on the set of available processors P can perform the method of FIG. 6 in parallel to achieve a block-based parallel in-place MPI matrix transpose of an input matrix.

In the method of FIG. 6, block-based MPI pairwise send and receive exchanges are performed for all the submatrix data blocks between the target matrix transpose task and one remote matrix transpose task and then between the target matrix transpose task and the next remote matrix transpose task and so on until pairwise send and receive exchanges have been performed between the target matrix transpose task and every other remote matrix transpose task executing on the set of available processors P.

Figure 7:
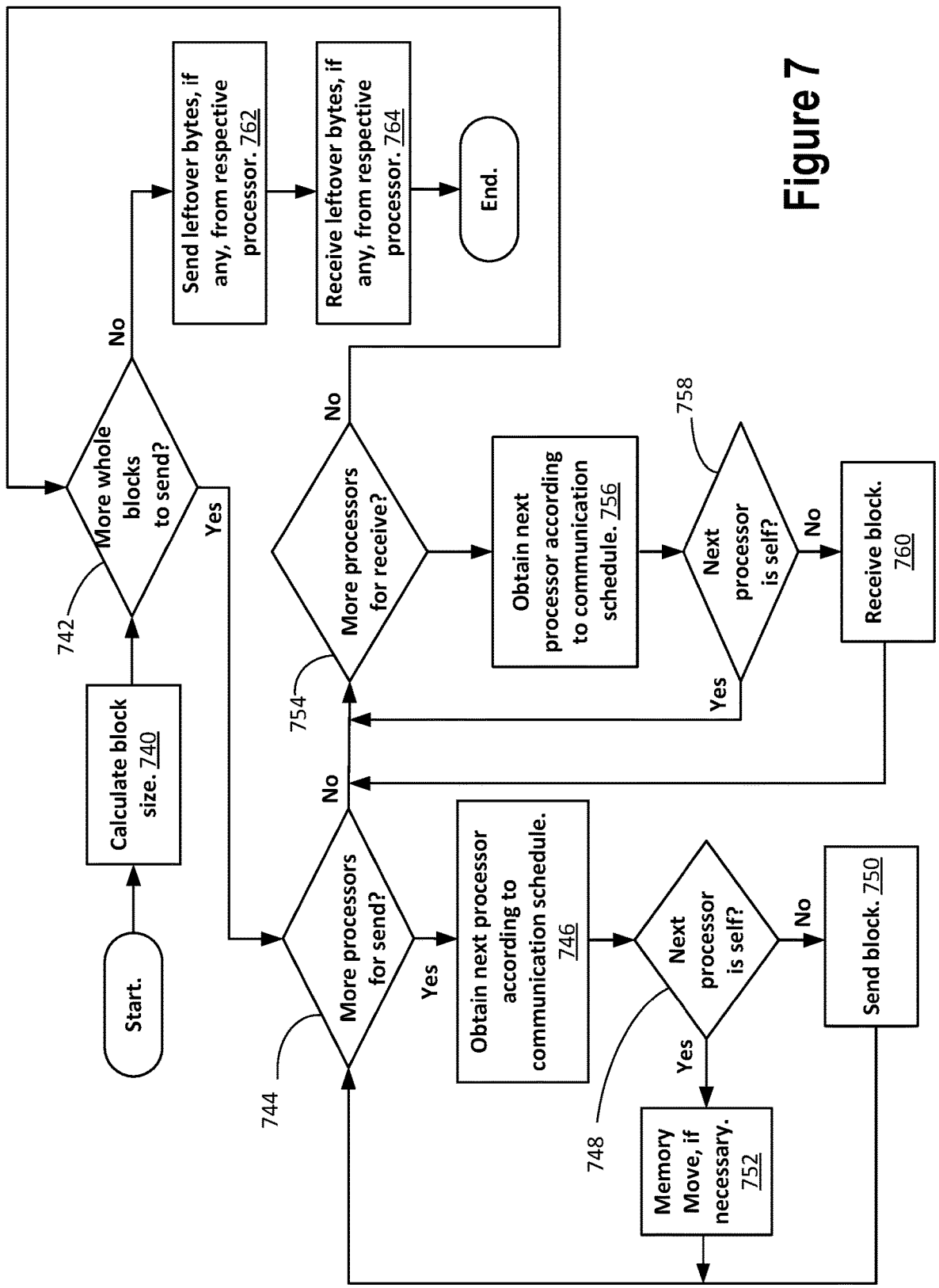
FIG. 7 is a flowchart of a second example method for fast block-based parallel messaging passing interface matrix transpose.

FIG. 7 provides an alternative scheme where block-based MPI pairwise send and receive exchanges are performed for the first submatrix data block to be sent by the target matrix transpose task to each other remote matrix transpose task, then the next submatrix data block to be sent by the target matrix transpose task to each other remote matrix transpose task and so on. Either the method of FIG. 6 or the method of FIG. 7 can be used to achieve a block-based parallel in-place MPI matrix transpose without having to make an in-memory copy of the submatrix data of the input matrix to use as a send buffer thereby achieving a much lower compute time and reduced storage media allocation overhead Turning now to FIG. 7, it illustrates an example method performed by a "target" matrix transpose task executing on a processor in accordance with some embodiments of the present invention. FIG. 7 is shown in simplified, schematic format for purposes of illustrating a clear example and other embodiments may include more, fewer, or different elements connected in various manners. FIG. 7 is intended to disclose an algorithm, plan or outline that can be used to implement one or more computer programs or other software elements which when executed cause performing the functional improvements and technical advances that are described herein. Furthermore, the flow diagram is described at the same level of detail that persons of ordinary skill in the art ordinarily use to communicate with one another about algorithms, plans, or specifications forming a basis of software programs that they plan to code or implement using their accumulated skill and knowledge.

The method of FIG. 7 starts given some "target" submatrix data for which the target matrix transpose task is tasked to send to other matrix transpose tasks as part of an overall parallel matrix transpose of the input matrix. For example, the matrix transpose task executing on processor 506-1 has the submatrix data B01, B02, C01, C02, D01, D02 of input matrix 502 to send to the matrix transpose tasks executing on processors 506-2, 506-3, and 506-4. Submatrix data A01, A02 of input matrix 502 will stay in-place in transposed matrix 504 and does not need to be sent to another matrix transpose task.

At operation 740, the target matrix transpose task determines the submatrix data block size for the target submatrix data to send to each other matrix transpose task. This determination may be made based on the eager limit for the MPI network interconnect being used. If the size of the target submatrix data to send to each other matrix transpose task plus the size of any envelope data for MPI messages is less than the eager limit, then the submatrix data block size is the size of the target submatrix data to send to each other matrix transpose task. Otherwise, the submatrix data block size is the eager limit minus the size of any per-MPI message envelope data. In situations where an envelope is not used, then the size of the target submatrix data to send to other matrix transpose task is the size of the target submatrix data or the eager limit, whichever is smaller.

For example, referring to FIG. 5, the size of submatrix data B01, B02 is the size of the target submatrix data to send to each other matrix transpose task and the matrix transpose task executing on processor 506-1 divides in-place the submatrix data B01, B02 into submatrix data block B01 and submatrix data block B02. Each submatrix data block B01 and B02 have size up to at most eager limit of the MPI network interconnect being used.

At operation 742, if is determined if there are no more whole submatrix data blocks to send from the target matrix transpose task to other matrix transpose tasks, then the method proceeds to operation 762 where the target matrix transpose task sends any left-over bytes to each of the other matrix transpose tasks. Operation 762 may include the target matrix transpose task sending an MI message containing left-over bytes to each of the other matrix transpose tasks. After operation 762, the target matrix transpose task receives 764 any left-over bytes from each of the other matrix transpose tasks. Operation 764 may include the target matrix transpose task receiving an MPI message containing left-over bytes from each of the other matrix transpose tasks. After operations 762 and 764 are performed, the method ends.

On the other hand, if, at operation 742, it is determined that there are more whole submatrix data blocks to send from the target matrix transpose task to other matrix transpose tasks, then the method proceeds to operation 744.

Operations 744 through 752 are performed in a loop by the target matrix transpose task, once for each matrix transpose task, including the target matrix transpose task, that executes on the set of available processors P. The matrix transpose tasks are considered in order of the predetermined communication schedule for the target matrix transpose task which may be like the predetermined communication schedule discussed above with respect to operation 622 in the method of FIG. 6. In particular, at operation 744, if all matrix transpose tasks have not been considered once during the send loop, then the method proceeds to operation 746. At operation 746, the next matrix transpose task according to the predetermined communication schedule for the target matrix transpose task is determined. Then, the target matrix transpose task determines 748 if the next matrix transpose task is itself. If it is itself, then the target matrix transpose task may move 752 submatrix data locally within storage media, if the input matrix is non-square. If the next matrix transpose task is a remote matrix transpose task, then the target matrix transpose task sends 750 the next submatrix data block to be sent to the next matrix transpose task in an MI message.

If the memory move operation at block 752 is needed because the input matrix is non-square, then the memory move operation at block 752 can be performed block-wise for each of the whole blocks when the next matrix transpose task is itself. That is, a separate memory move operation is performed for each whole block. Alternatively, the memory move operation at block 752 can be performed for all of the whole blocks together when the next matrix transpose task is itself. This later alternative may be preferred to limit the number of memory move operations 752 performed.

By the end of the send loop 744 through 752, the target matrix transpose task has sent a submatrix data block to each of the other matrix transpose tasks. For example, referring to FIG. 5, if the target matrix transpose task is the one executing on processor 506-1, then the target matrix transpose task has sent an MI message containing block B01 to the remote matrix transpose task executing on processor 506-2, the target matrix transpose task has sent an MI message containing block C01 to the remote matrix transpose task executing on processor 506-3, and the target matrix transpose task has sent an MPI message containing block D01 to the remote matrix transpose task executing on processor 506-4. The target matrix transpose task will send submatrix data blocks B02, C02, and D02 during the next set of iterations of the send loop 744 through 752 after the first set of iterations of the receive loop 754 through 760 has been performed.

Operations 754 through 760 are performed in a loop by the target matrix transpose task once for each matrix transpose task, including the target matrix transpose task, that executes on the set of available processors P. The matrix transpose tasks are considered in order of the predetermined communication schedule for the target matrix transpose task which may be like the predetermined communication schedule discussed above with respect to operation 622 of the method of FIG. 6. In particular, at operation 754, if all matrix transpose tasks have not been considered once during the receive loop, then the method proceeds to operation 756. At operation 756, the next matrix transpose task according to the predetermined communication schedule for the target matrix transpose task is determined. Note that for each set of iterations of the send loop 744 through 752 and for each set of iterations of the receive loop 754 through 760, the predetermined communication schedule can be considered again from the beginning starting with the first matrix transpose task according to the schedule. If target matrix transpose task determines 758 if the next matrix transpose task is itself, then the receive loop iteration 754 through 760 can return to operation 754 to consider the next matrix transpose task in the schedule. If, on the other hand, the next matrix transpose task is a remote matrix transpose task, then the target matrix transpose task receives 760 the next submatrix data block to be received from the next matrix transpose task in an MI message.

By the end of the receive loop 754 through 760, the target matrix transpose task has received a submatrix data block from each of the other matrix transpose tasks. For example, referring to FIG. 5, if the target matrix transpose task is the one executing on processor 506-1, then the target matrix transpose task has received an MI message containing block A11 from the remote matrix transpose task executing on processor 506-2, the target matrix transpose task has received an MI message containing block A21 from the remote matrix transpose task executing on processor 506-3, and the target matrix transpose task has received an MPI message containing block A31 from the remote matrix transpose task executing on processor 506-4. The target matrix transpose task will receive submatrix data blocks A12, A22, and A32 during the next set of iterations of the receive loop 754 through 760 after the second set of iterations of the send loop 744 through 752 has been performed.

After a set of iterations of the receive loop 754 through 760, the method then returns to operation 742.

Each matrix transpose task executing on the set of available processors P can perform the method of FIG. 7 in parallel to achieve a block-based parallel in-place MPI matrix transpose of an input matrix.

Figure 8:
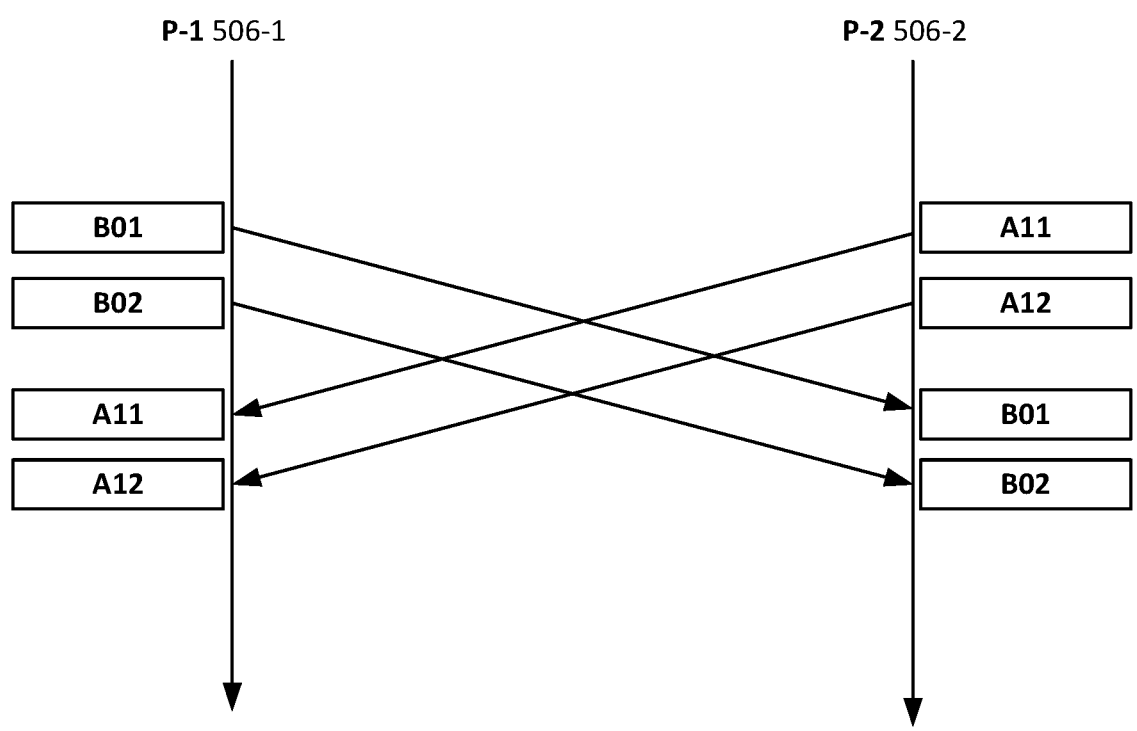
FIG. 8 depicts an example pairwise send and receive exchanges between two matrix transpose processes executing on two processors of the example of FIG. 5, according to the method of FIG. 6.

FIG. 8 depicts an example pairwise send and receive exchanges between the two matrix transpose tasks executing on processors 506-1 and 506-2 of the example of FIG. 5, according to the method of FIG. 6. According to the method of FIG. 6, the matrix transpose task executing on processor 506-1 sends all submatrix data blocks to be sent to the matrix transpose task executing on processor 506-2 before receiving any submatrix data blocks from the matrix transpose task executing on processor 506-2 that will overwrite the submatrix data blocks sent. Likewise, the matrix transpose task executing on processor 506-2 sends all submatrix data blocks to be sent to the matrix transpose task executing on processor 506-1 before receiving any submatrix data blocks from the matrix transpose task executing on processor 560-1 that will overwrite the submatrix data blocks sent.

Figure 9:
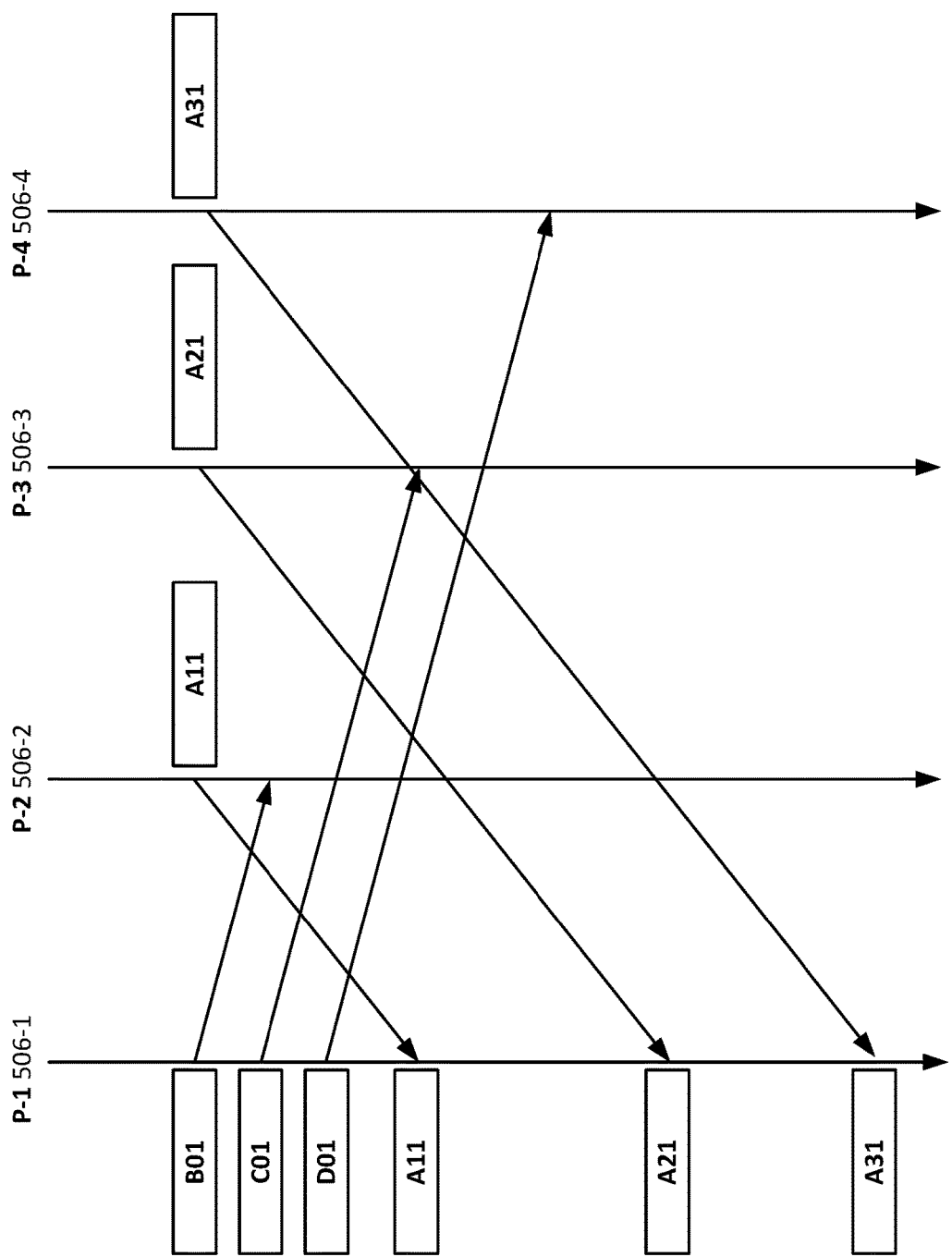
FIG. 9 depicts an example pairwise send and receive exchanges between four matrix transpose tasks executing on four processors of the example of FIG. 5, according to the method of FIG. 7.

FIG. 9 depicts an example pairwise send and receive exchanges between four matrix transpose tasks executing on processors 506-1, 506-2, 506-3, and 506-4 of the example of FIG. 5, according to the method of FIG. 7. According to the method of FIG. 7, the matrix transpose task executing on processor 506-1 sends the first submatrix data block to be sent to each of the other matrix transpose tasks executing on processors 506-2, 506-3, and 506-4 before receiving any submatrix data blocks from the other matrix transpose tasks that will overwrite in-place the first submatrix data blocks sent.

7. Hardware Implementation

According to some embodiments of the present invention, the techniques described herein are implemented by at least one computer system. The techniques may be implemented in whole or in part using a combination of at least one server computer or other computer systems that are coupled using a network, such as a packet data network. The computer systems may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computer systems may also combine custom hard-wired logic, ASICs, or FPGAs with custom programming to accomplish the described techniques.

The computer systems may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired or program logic to implement the described techniques, one or more virtual computing machines or instances in a data center, or a network of server computers or personal computers.

Figure 10:
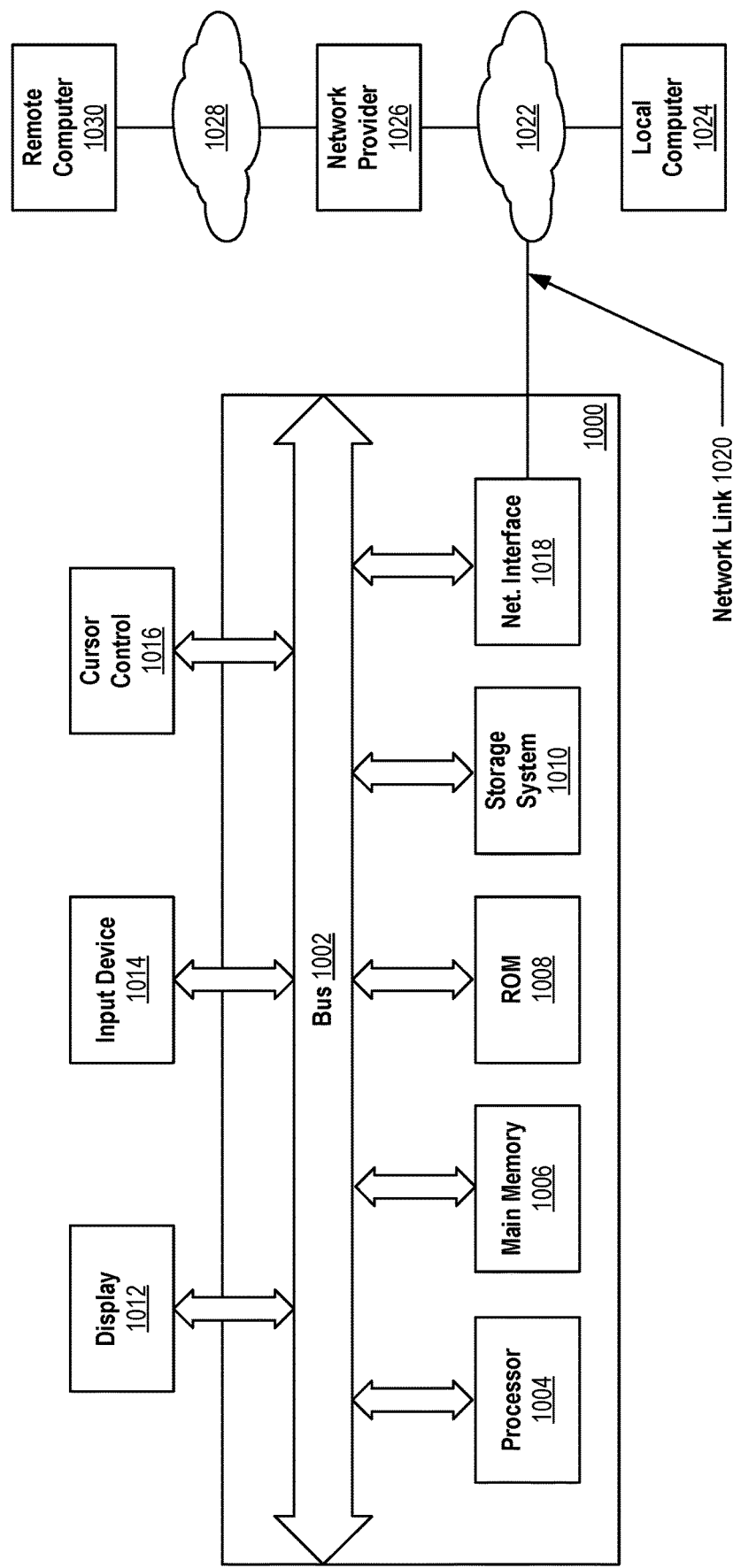
FIG. 10 is a block diagram that illustrates a computer system upon which some embodiments may be implemented.

FIG. 10 is a block diagram that illustrates an example computer system with which some embodiments may be implemented. In the example of FIG. 10, a computer system 1000 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1000 includes an input/output (I/O) subsystem 1002 which may include a bus or other communication mechanism(s) for communicating information or instructions between the components of the computer system 1000 over electronic signal paths. The I/O subsystem 1002 may include an I/O controller, a memory controller and at least one I/O port. The electronic signal paths are represented schematically in the drawings, for example as lines, unidirectional arrows, or bidirectional arrows.

At least one hardware processor 1004 is coupled to I/O subsystem 1002 for processing information and instructions. Hardware processor 1004 may include, for example, a general-purpose microprocessor or microcontroller or a special-purpose microprocessor such as an embedded system or a graphics processing unit (GPU) or a digital signal processor or ARM processor. Processor 1004 may comprise an integrated arithmetic logic unit (ALU) or may be coupled to a separate ALU.

Computer system 1000 includes one or more units of memory 1006, such as a main memory, which is coupled to I/O subsystem 1002 for electronically digitally storing data and instructions to be executed by processor 1004. Memory 1006 may include volatile memory such as various forms of random-access memory (RAM) or other dynamic storage device. Memory 1006 also may be used for storing temporary variables or other intermediate information during execution of instructions to be executed by processor 1004. Such instructions, when stored in non-transitory computer-readable storage media accessible to processor 1004, can render computer system 1000 into a special-purpose machine that is customized to perform the operations specified in the instructions.

Computer system 1000 further includes non-volatile memory such as read only memory (ROM) 1008 or other static storage device coupled to I/O subsystem 1002 for storing information and instructions for processor 1004. The ROM 1008 may include various forms of programmable ROM (PROM) such as erasable PROM (EPROM) or electrically erasable PROM (EEPROM). A unit of persistent storage 1010 may include various forms of non-volatile RAM (NVRAM), such as FLASH memory, or solid-state storage, magnetic disk or optical disk such as CD-ROM or DVD-ROM, and may be coupled to I/O subsystem 1002 for storing information and instructions. Storage 1010 is an example of a non-transitory computer-readable medium that may be used to store instructions and data which when executed by the processor 1004 cause performing computer-implemented methods to execute the techniques herein.

The instructions in memory 1006, ROM 1008 or storage 1010 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 1000 may be coupled via I/O subsystem 1002 to at least one output device 1012. In some embodiments, output device 1012 is a digital computer display. Examples of a display that may be used in some embodiments include a touch screen display or a light-emitting diode (LED) display or a liquid crystal display (LCD) or an e-paper display. Computer system 1000 may include other type(s) of output devices 1012, alternatively or in addition to a display device. Examples of other output devices 1012 include printers, ticket printers, plotters, projectors, sound cards or video cards, speakers, buzzers or piezoelectric devices or other audible devices, lamps or LED or LCD indicators, haptic devices, actuators or servos.

At least one input device 1014 is coupled to I/O subsystem 1002 for communicating signals, data, command selections or gestures to processor 1004. Examples of input devices 1014 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 1016, which may perform cursor control or other automated control functions such as navigation in a graphical interface on a display screen, alternatively or in addition to input functions. Control device 1016 may be a touchpad, a mouse, a trackball, or cursor direction keys for communicating direction information and command selections to processor 1004 and for controlling cursor movement on display 1012. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1014 may include a combination of multiple different input devices, such as a video camera and a depth sensor.

In some embodiments, computer system 1000 may comprise an internet of things (IoT) device in which one or more of the output device 1012, input device 1014, and control device 1016 are omitted. In some embodiments, the input device 1014 may comprise one or more cameras, motion detectors, thermometers, microphones, seismic detectors, other sensors or detectors, measurement devices or encoders and the output device 1012 may comprise a special-purpose display such as a single-line LED or LCD display, one or more indicators, a display panel, a meter, a valve, a solenoid, an actuator or a servo.

When computer system 1000 is a mobile computing device, input device 1014 may comprise a global positioning system (GPS) receiver coupled to a GPS module that is capable of triangulating to a plurality of GPS satellites, determining and generating geo-location or position data such as latitude-longitude values for a geophysical location of the computer system 1000. Output device 1012 may include hardware, software, firmware and interfaces for generating position reporting packets, notifications, pulse or heartbeat signals, or other recurring data transmissions that specify a position of the computer system 1000, alone or in combination with other application-specific data, directed toward host 1024 or server 1030.

Computer system 1000 may implement the techniques described herein using customized hard-wired logic, at least one ASIC or FPGA, firmware or program instructions or logic which when loaded and used or executed in combination with the computer system causes or programs the computer system to operate as a special-purpose machine. According to some embodiments, the techniques herein are performed by computer system 1000 in response to processor 1004 executing at least one sequence of at least one instruction contained in main memory 1006. Such instructions may be read into main memory 1006 from another storage medium, such as storage 1010. Execution of the sequences of instructions contained in main memory 1006 causes processor 1004 to perform the process steps described herein. In some embodiments, hard-wired circuitry may be used in-place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage 1010. Volatile media includes dynamic memory, such as memory 1006. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1002. Transmission media can also take the form of acoustic or light waves, such as those generated during radio-wave and infra-red data communications.

Various forms of media may be involved in carrying at least one sequence of at least one instruction to processor 1004 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1000 can receive the data on the communication link and convert the data to be read by computer system 1000. For instance, a receiver such as a radio frequency antenna or an infrared detector can receive the data carried in a wireless or optical signal and appropriate circuitry can provide the data to I/O subsystem 1002 such as place the data on a bus. I/O subsystem 1002 carries the data to memory 1006, from which processor 1004 retrieves and executes the instructions. The instructions received by memory 1006 may optionally be stored on storage 1010 either before or after execution by processor 1004.

Computer system 1000 also includes a communication interface 1018 coupled to bus 1002. Communication interface 1018 provides a two-way data communication coupling to network link(s) 1020 that are directly or indirectly connected to at least one communication networks, such as a network 1022 or a public or private cloud on the Internet. For example, communication interface 1018 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1022 broadly represents a local area network (LAN), wide-area network (WAN), campus network, internetwork or any combination thereof. Communication interface 1018 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1018 sends and receives electrical, electromagnetic or optical signals over signal paths that carry digital data streams representing various types of information.

Communication interface 1018 can be based on an interconnect technology used for distributed computing systems, supercomputer systems, and high-performance computing systems. For example, communication interface 1018 can be based on OMNI-PATH, INFINIBAND, ARIES, NVLINK, TOFU, or ethernet.

Network link 1020 typically provides electrical, electromagnetic, or optical data communication directly or through at least one network to other data devices, using, for example, satellite, cellular, Wi-Fi, or BLUETOOTH technology. For example, network link 1020 may provide a connection through a network 1022 to a host computer 1024.

Furthermore, network link 1020 may provide a connection through network 1022 or to other computing devices via internetworking devices or computers that are operated by an Internet Service Provider (ISP) 1026. ISP 1026 provides data communication services through a world-wide packet data communication network represented as internet 1028.

A server computer 1030 may be coupled to internet 1028. Server 1030 broadly represents any computer, data center, virtual machine or virtual computing instance with or without a hypervisor, or computer executing a containerized program system such as DOCKER or KUBERNETES. Server 1030 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1000 and server 1030 may form elements of a distributed computing system that includes other computers, a processing cluster, server farm or other organization of computers that cooperate to perform tasks or execute applications or services. Server 1030 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1030 may comprise a web application server that hosts a presentation layer, application layer and data storage layer such as a relational database system using structured query language (SQL) or NoSQL, an object store, a graph database, a flat file system or other data storage.

Computer system 1000 can send messages and receive data and instructions, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, or stored in storage 1010, or other non-volatile storage for later execution.

The execution of instructions as described in this section may implement a computing task in the form of an instance of a computer program that is being executed and consisting of program code and its current activity. Depending on the operating system (OS), a task may be made up of multiple threads of execution that execute instructions concurrently. In this context, a computer program is a passive collection of instructions, while a task may be the actual execution of those instructions. Several tasks may be associated with the same program; for example, opening up several instances of the same program often means more than one task is being executed. Multitasking may be implemented to allow multiple processes to share processor 1004. While each processor 1004 or core of the processor executes a single task at a time, computer system 1000 may be programmed to implement multitasking to allow each processor to switch between tasks that are being executed without having to wait for each task to finish. In some embodiments, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple tasks simultaneously. In some embodiments, for security and reliability, an operating system may prevent direct communication between independent processes, providing strictly mediated and controlled inter-process communication functionality.

8. Other Aspects of the Disclosure

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like, are used in the foregoing specification and in the appended claims in an open-ended fashion, and do not exclude additional elements, features, acts, or operations.

Unless the context clearly indicates otherwise, conjunctive language such as the phrase "at least one of X, Y and Z," is to be understood to convey that an item, term, etc. may be either X, Y or Z, or a combination thereof. Thus, such conjunctive language is not intended to imply that certain embodiments require at least one of X, at least one of Y and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, some embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising at a first computing task of a plurality of computing tasks executing at a plurality of processors:
   dividing in-place submatrix data to send to a second computing task of the plurality of computing tasks into a first plurality of submatrix data blocks;
   using in-place each submatrix data block of the first plurality of submatrix data blocks as a buffer for a message passing interface application programming interface to send each submatrix data block of the first plurality of submatrix data blocks to the second computing task; and
   overwriting in-place the first plurality of submatrix data blocks by receiving, from the message passing interface application programming interface directly into the buffer, a second plurality of submatrix data blocks from the second computing task.

2. The method of claim 1, wherein:
   each submatrix data block of the first plurality of submatrix data blocks has up to at most a predetermined size; and
   each submatrix data block of the second plurality of submatrix data blocks has up to at most the predetermined size.

3. The method of claim 2, further comprising:
   at the first computing task:
   determining the predetermined size based on a type of a message passing interface network interconnect between the plurality of computing tasks.

4. The method of claim 1, further comprising:
   at the first computing task:
   using the message passing interface application programming interface to send each submatrix data block of the first plurality of submatrix data blocks in a separate message passing interface message.

5. The method of claim 1, further comprising:
at the first computing task:
using the message passing interface application programming interface to send leftover bytes of the submatrix data to the second computing task;
using the message passing interface application programming interface to receive leftover bytes from the second computing task; and
overwriting in-place the leftover bytes sent to the second computing task with the leftover bytes received from the second computing task only after using the message passing interface application programming interface to send the leftover bytes of the submatrix data to the second computing task.

6. The method of claim 1, further comprising:
at the first computing task:
using the message passing interface application programming interface to send all of the first plurality of submatrix data blocks to the second computing task before using the message passing interface application programming interface to receive any of the second plurality of submatrix data blocks.

7. The method of claim 1, further comprising:
at the first computing task:
using the message passing interface application programming interface to send one submatrix data block to each other computing task of the plurality of computing tasks before using the message passing interface application programming interface to receive one submatrix data block from each other computing task of the plurality of computing tasks.

8. One or more non-transitory storage media storing instructions which, executed with a plurality of computing tasks at a plurality of processors, cause a first computing task of the plurality of computing tasks to:
divide in-place submatrix data to send to a second computing task of the plurality of computing tasks into a first plurality of submatrix data blocks;
use in-place each submatrix data block of the first plurality of submatrix data blocks as a buffer for a message passing interface application programming interface to send each submatrix data block of the first plurality of submatrix data blocks to the second computing task; and
overwrite in-place the first plurality of submatrix data blocks by receiving, from the message passing interface application programming interface directly into the buffer, a second plurality of submatrix data blocks from the second computing task.

9. The one or more non-transitory storage media of claim 8, wherein:
each submatrix data block of the first plurality of submatrix data blocks has up to at most a predetermined size;
each submatrix data block of the second plurality of submatrix data blocks has up to at most the predetermined size; and
the one or more non-transitory storage media further comprise instructions which, executed with the plurality of computing tasks at the plurality of processors, cause each computing task of the plurality of computing tasks to determine the predetermined size based on a type of a message passing interface network interconnect between the plurality of computing tasks.

10. The one or more non-transitory storage media of claim 8, further comprising:
instructions which, executed with the plurality of computing tasks at the plurality of processors, cause the first computing task to:
use the message passing interface application programming interface to send each submatrix data block of the first plurality of submatrix data blocks to another computing task in a separate message passing interface message.

11. The one or more non-transitory storage media of claim 8, further comprising:
instructions which, executed with the plurality of computing tasks at the plurality of processors, cause each computing task of the plurality of computing tasks to:
use the message passing interface application programming interface to send leftover bytes of the submatrix data to an other computing task;
use the message passing interface application programming interface to receive leftover bytes from the other computing task; and
overwriting in-place the leftover bytes sent to the other computing task with the leftover bytes received from the other computing task after using the message passing interface application programming interface to send the leftover bytes of the submatrix data to the other computing task.

12. A first microprocessor of a plurality of microprocessors, the first microprocessor configured to:
divide in-place submatrix data to send to a second microprocessor of the plurality of microprocessors into a first plurality of submatrix data blocks;
use in-place each submatrix data block of the first plurality of submatrix data blocks as a buffer for a message passing interface application programming interface to send each submatrix data block of the first plurality of submatrix data blocks to the second microprocessor; and
overwrite in-place the first plurality of submatrix data blocks by receiving, from the message passing interface application programming interface directly into the buffer, a second plurality of submatrix data blocks from the second microprocessor.

13. The first microprocessor of claim 12, wherein:
each submatrix data block of the first plurality of submatrix data blocks has up to at most a predetermined size;
each submatrix data block of the second plurality of submatrix data blocks has up to at most the predetermined size; and
the first microprocessor further configured to determine the predetermined size based on a type of a message passing interface network interconnect between the plurality of microprocessors.

14. The first microprocessor of claim 12, the first microprocessor further configured to:
use the message passing interface application programming interface to send each submatrix data block of the first plurality of submatrix data blocks in a separate message passing interface message.

15. The first microprocessor of claim 12, the first microprocessor further configured to:
use the message passing interface application programming interface to send leftover bytes of the submatrix data to the second microprocessor;
use the message passing interface application programming interface to receive leftover bytes from the second microprocessor; and
overwrite in-place the leftover bytes sent to the second microprocessor with the leftover bytes received from the second microprocessor after using the message passing interface application programming interface to send the leftover bytes of the submatrix data to the second microprocessor.

* * * * *